United States Patent

[11] 3,599,991

[72] Inventors Marvin G. Combes
Castro Valley;
Roger L. Ripert, Concord, both of, Calif.
[21] Appl. No. 873,034
[22] Filed Oct. 31, 1969
[45] Patented Aug. 17, 1971
[73] Assignee Grove Valve and Regulator Company
Oakland, Calif.

[54] AUXILIARY VALVE STEM SEAL
5 Claims, 5 Drawing Figs.
[52] U.S. Cl. ........................................... 277/9,
277/34, 251/214
[51] Int. Cl. ........................................... F16j 9/00,
F02f 11/00
[50] Field of Search ........................................... 277/9, 34,
343, 59, 174; 251/214; 137/315

[56] References Cited
UNITED STATES PATENTS

| | | | |
|---|---|---|---|
| 2,625,413 | 1/1953 | Christensen .................. | 277/187 |
| 2,943,874 | 7/1960 | Valdi et al. .................. | 277/34.3 |
| 3,096,070 | 7/1963 | Wolfensperger .............. | 277/59 X |
| 3,400,937 | 10/1968 | Crankshaw .................. | 277/34 |

FOREIGN PATENTS

| 820,020 | 9/1959 | Great Britain ................ | 277/34.3 |
|---|---|---|---|

*Primary Examiner*—Samuel B. Rothberg
*Attorney*—Melvin R. Stidham

ABSTRACT: An auxiliary valve stem seal which permits removal and replacement of the main stem packing. An elastomeric ring around the stem inward of the main packing is normally of an inner diameter larger than the stem so that it is ineffective as a seal. A pressure fluid is selectively introduced around the seal ring, causing it to deform to a smaller diameter and seal around the stem. When the main stem packing is repaired and replaced, the sealing pressure fluid is relieved to render the auxiliary seal ineffective.

INVENTOR.
MARVIN G. COMBES
ROGER L. RIPERT
BY Melvin R Stidham
ATTORNEY

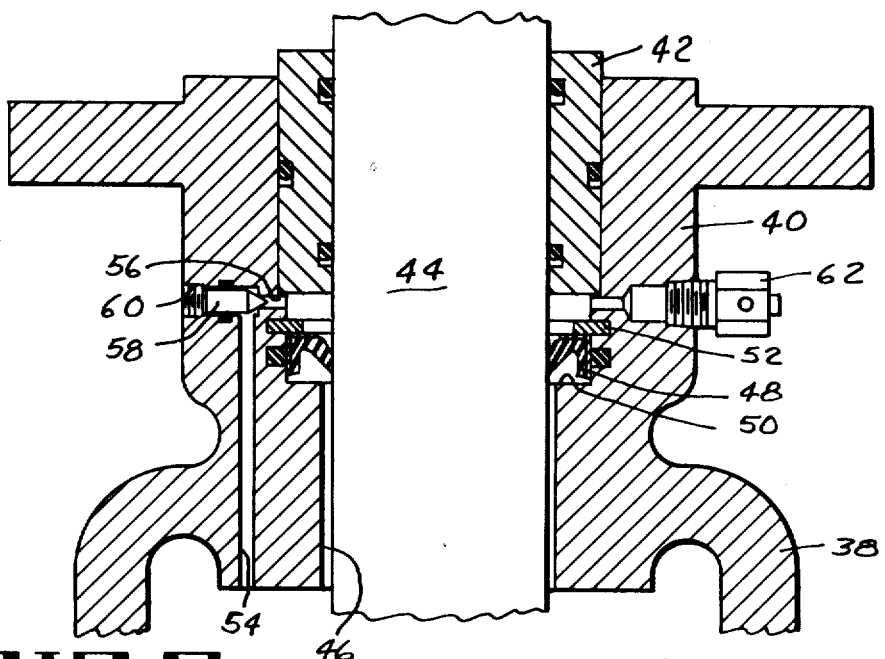
FIG-3-
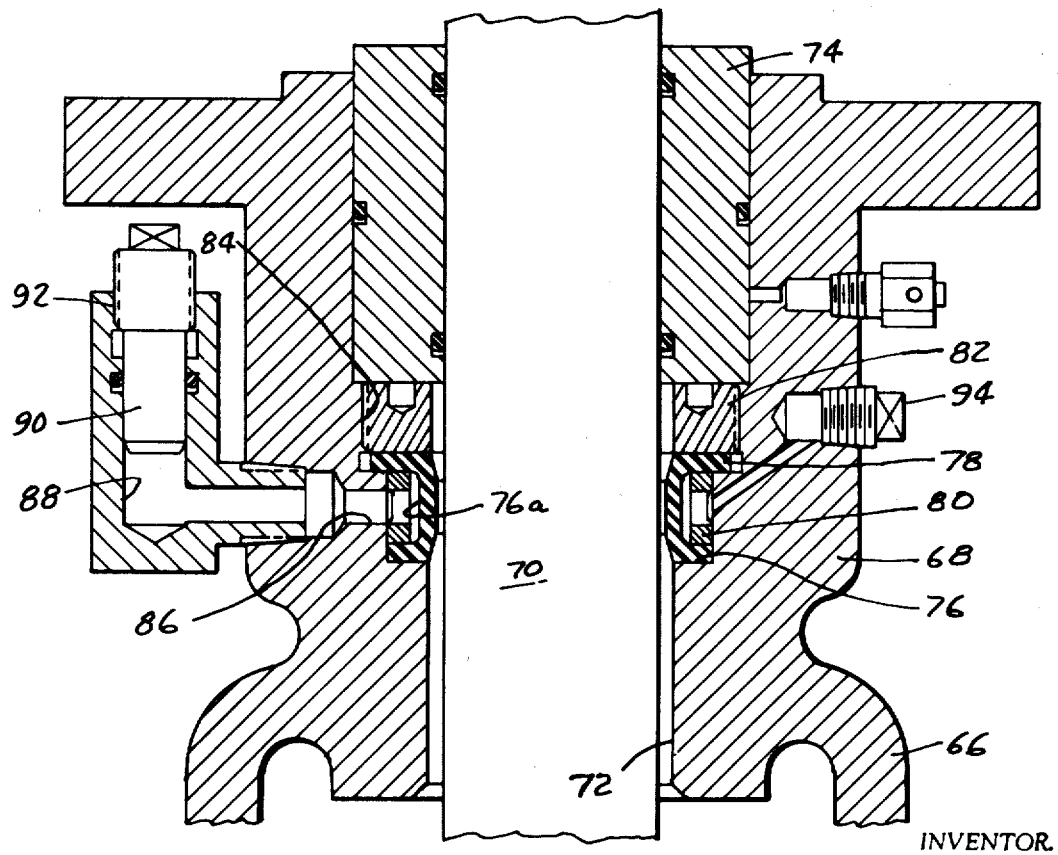
FIG-4-

AUXILIARY VALVE STEM SEAL

BACKGROUND OF THE INVENTION

This invention relates to an auxiliary valve stem seal and, more particularly, to a seal which may be activated selectively to seal around the valve stem and thereby enable the removal and replacement of the main stem packing while the valve is still in the line.

In the conventional gate, globe, angle and similar valves, a seal is provided in the bonnet around the valve stem in order to retain pressure within the valve body. The valve stem packing may comprise a resilient material held against the stem by a retainer or simply a bushing with suitable seal rings. In most cases, the stem seal cannot be removed and replaced with the valve in the line under pressure. Some valves do permit repacking or replacing the stem seal while the valve is under pressure, but there is a further limitation in such valves in that the repacking is possible only with the valve in open position. In such valves, there is a smoothly finished shoulder on the stem or a portion of the top of the valve closure member is finished, to provide a metal-to-metal seal in the bonnet when the valve stem is raised to its fully open position.

OBJECTS OF THE INVENTION

It is an object of this invention to provide an auxiliary valve stem seal which may be activated selectively to permit removal and replacement of the main stem seal means.

It is a further object of this invention to provide an auxiliary valve stem seal which may be activated to enable repacking the stem in any position thereof.

Other objects and advantages of the invention will become apparent from the detailed description to follow when read in conjunction with the accompanying drawing.

BRIEF DESCRIPTION OF THE INVENTION

In a preferred embodiment of this invention, a recess is provided around the bonnet opening inward of the main valve stem packing, and an elastomeric ring in the recess is squeezed axially to seal across the recess in an axial direction. The seal ring normally has an inner diameter larger than the stem so that it surrounds it freely and does not seal around it. A duct leads into the recess behind the seal ring from a source of relatively high-pressure fluid, as for example, the valve body or the upstream hub. A three-way control valve means normally closes the duct to pressure fluid, but may selectively be opened to direct the high-pressure fluid behind the seal ring. With the seal ring sealing across the recess, the pressure drives it radially inward around its circumference to squeeze around the stem, sealing off the bonnet. Then, the main packing may be removed and serviced and, when it is replaced, the control valve is operated, first to shut off the pressure source and then to relieve the auxiliary seal to atmosphere. The relief passage may subsequently be closed when the seal ring expands to its normal diameter.

BRIEF DESCRIPTION OF THE DRAWING

FIGS. 3 and 4 are enlarged partial section views of valve bonnet constructions with other embodiments of this invention.

DESCRIPTION OF THE PREFERRED EMBODIMENTS

Figure 1:
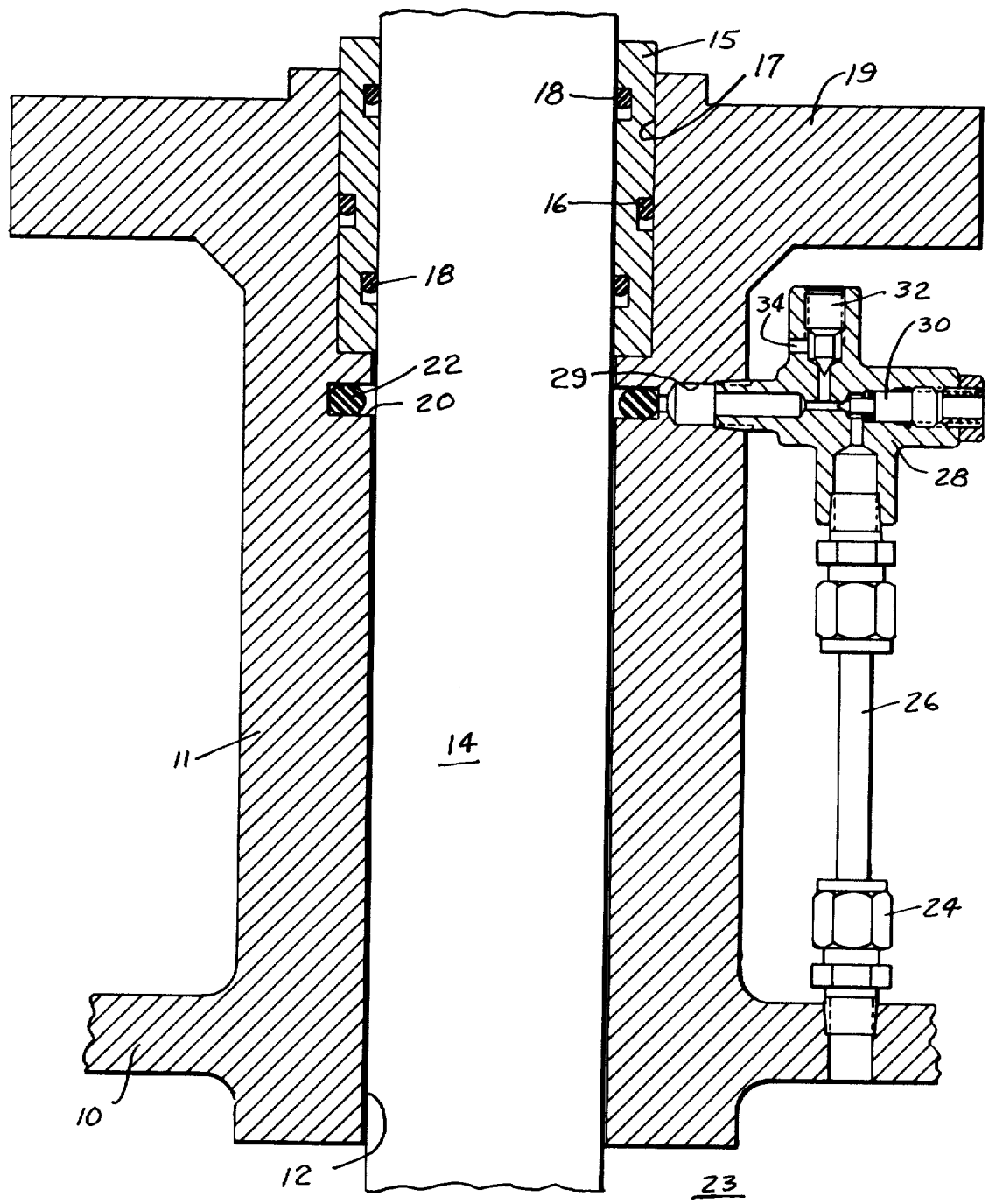
FIG. 1 is an enlarged partial section view of a valve bonnet and stem embodying features of this invention.

The Embodiment of FIG. 1

Referring more particularly to FIG. 1, there is illustrated a valve body 10 with a conventional bonnet having an opening 12 therethrough to accommodate a valve stem 14. A stem bushing 15 carries an outer O-ring 16 which seals between the stem bushing 15 and the counterbore wall 17, and one or more inner O-rings 18 to seal around the stem 14. A flange 19 at the upper end of the valve body stem is provided for attachment of a suitable valve-operating device (not shown).

Situated below the stem packing 15 is a recess 20 which accommodates an O-ring 22 or similar resilient seal means. The resilient seal is of a thickness in the axial direction relative to the recess 20 such that the seal ring will be squeezed between the sidewalls of the recess. At the same time, it is of a radius such that it is completely accommodated within the recess 20 and out of contact with the valve stem 12 while in its normal configuration shown in FIG. 1. That is the inner diameter of the seal ring 22 is sufficiently greater than the outer diameter of the valve stem 14 that it is completely ineffective to seal off any fluid flow that may occur in the clearances between the bonnet opening 12 and the valve stem 14. By the same token, it is free of frictional engagement with the stem 14 and is, therefore, not subject to wear.

Communicating with the valve body 10, as by means of fittings 24, is a duct 26 connected to a suitable three-way valve 28, the valve in turn being connected through the bonnet 11 to a port 29 opening into the bottom of the recess 20. The valve 28 may include a pressure valve closure plug 30 which normally closes off the duct 26 to the port 29 and normally closed exhaust valve plug 32 which may be retracted to evacuate the port 29 through the relief port 34.

In normal valve use, the seal ring 22 has no function and is completely ineffective as a seal, the stem packing 15 preventing any leakage of pressure fluid from around the stem 14 and out through the bonnet opening 12. However, should it occur that the stem packing 15 or any of the O-rings 16 or 18 become damaged, it is highly desirable to be able to replace the damaged parts without removing the valve from the line, or changing its setting, as by moving the valve to open position. This can be accomplished by opening the main valve closure plug 30 to pressurize the recess 20 behind the resilient seal 22 causing the seal ring to contract circumferentially and snugly embrace the valve stem 14. With the seal ring squeezed between the sidewalls of the recess 20, the pressure so introduced cannot leak past the ring 22 and will be concentrated fully on driving the ring radially inward to squeeze the stem to the position shown in FIG. 1A. Moreover, though the ring is contracted circumferentially, its volume is not changed. Therefore, its cross section increases and squeezes more firmly across the recess 20. In any event, the pressure of fluid in the valve body 10 that rises around the stem 14 will tend to squeeze the O-ring 22 against the upper wall of the recess 20 so that if there is any leakage of fluid from the port 29 past the ring 22, it will be around the bottom of the seal whereby pressure from the duct 26 and the body pressure 10 will tend to equalize, squeezing the seal ring against the upper wall of the recess and around the stem to close off the clearance immediately above the recess 20.

Figure 1A:
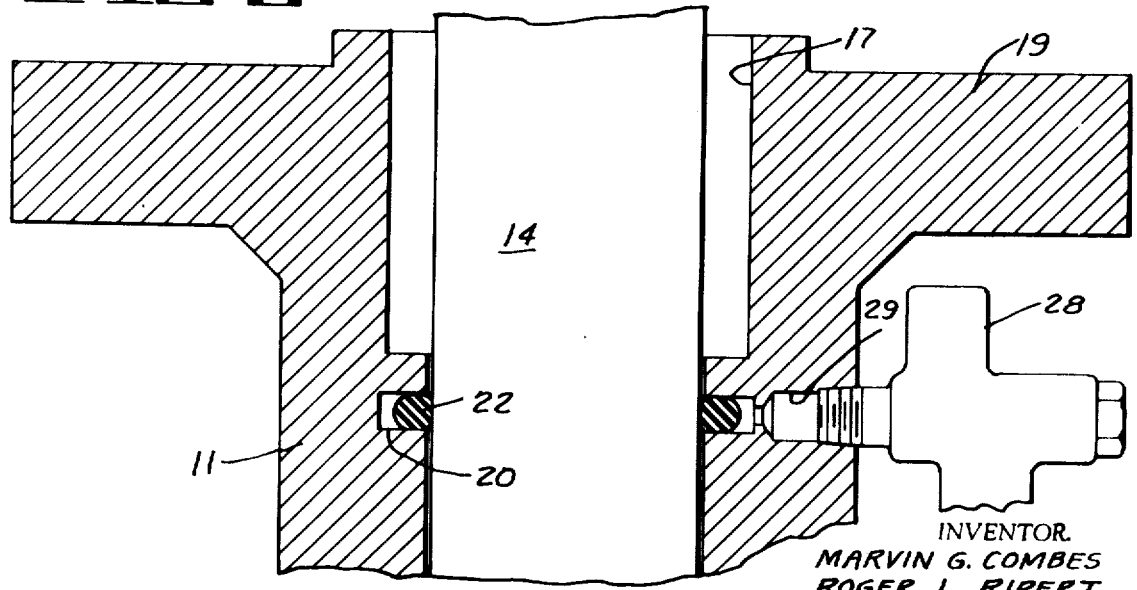
FIG. 1A is a further section view of the valve bonnet with the auxiliary seal activated.

While the resilient ring 22 is sealing off any leakage around the valve stem 14, the stem packing 15 may be removed as shown in FIG. 1A, and repaired or replaced. Thereafter, the packing 15 is replaced and the valve plug 30 is closed to shut off any further flow through the duct 26. Then, when the relief valve 32 is opened, the recess 20 will be relieved of pressure and the resilient ring 22 allowed to expand to its normal configuration out of contact with the stem 14.

Figure 2:
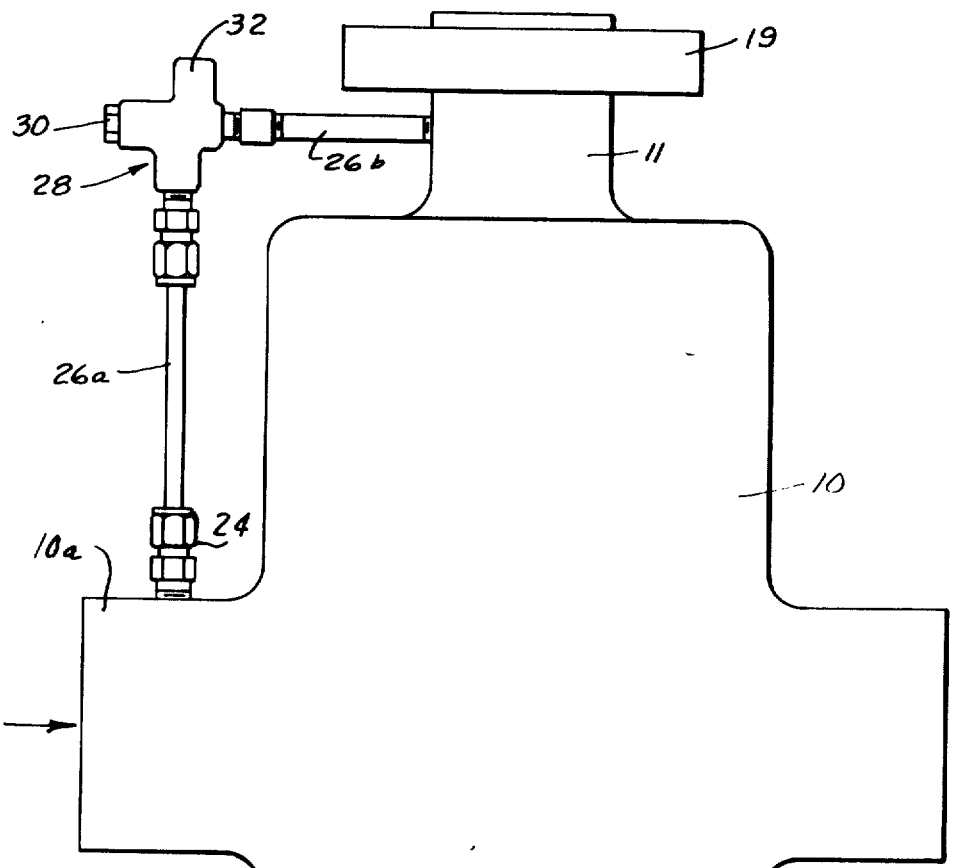
FIG. 2 is a plan view of a valve body illustrating another embodiment of this invention.

The Embodiment of FIG. 2

Referring now to FIG. 2, there is shown a slightly modified embodiment wherein the resilient seal may be pressurized by attachment of ducts 26 a 26 b to the upstream hub 10 a rather than to the body space as in the embodiment of FIG. 1. The duct 26 b is pressurized at 30, or exhausted at 32, by operation of a similar three-way valve 28.

The Embodiment of FIG. 3

In FIG. 3, there is shown a valve bonnet 38, 40 in which is carried a stem packing 42 similar to that shown in FIG. 1. The stem 44 is carried within an enlarged opening 46 which insures free flow of fluid up to the stem packing for purpose to be described. In this embodiment, a seal ring 48 is carried within a recess 50 and held in place, as by means of a snapring 52. The seal ring 48 is normally out of engagement with the valve stem 44 and is urged into the sealing position shown only under circumstances to be described. A flow passage 54 is bored into the bonnet in a direction generally parallel to the enlarged clearance 46 and then through a lateral port 56 into the recess 50 above the seal ring. The passageway 54, 56 is normally open to provide pressure equalization around the seal ring, but it may be closed by means of a suitable valve closure plug 58, which is threaded at 60 into the valve bonnet 40. Also opening into the recess 50 above the seal ring 48 is a vent valve 62.

In normal valve use of the embodiment of FIG. 3, the bypass valve 58 is open and the relief valve 62 is closed to provide pressure equalization around the seal ring 48 so that it remains in its normal undeformed condition out of engagement with the valve stem 44. However, when it is desired to replace the stem packing 42, the bypass valve 58 is threaded inward in order to close off the passageway 54, and then the vent valve is opened to relieve the upper part of the recess of body pressure. The resulting pressure differential across the seal ring 48 will cause it to deform upwardly into firm sealing engagement with the stem to permit removal and replacement of the stem packing without leakage. After the packing is replaced, the relief valve 62 is closed to shut off the recess to the atmosphere, and then the bypass valve 58 is opened to again equalize the pressure around the auxiliary seal.

The Embodiment of FIG. 4

In the embodiment of FIG. 4, there is provided a valve bonnet 66, 68 accommodating a valve stem 70 through an opening 72 therethrough. A stem packing 74 normally seals off the clearance 72 against leakage from the body interior. In a recess 76 below the stem packing, there is provided a channellike, resilient seal ring 78 and a perforated lantern ring 80 supported on the bottom of the recess 72 between the flanges of the channellike seal ring 76. The upper side of the recess is formed by a clamp ring 82, which is threaded into a complementary threaded opening 84 in the bonnet 68 to squeeze the flanges of the resilient ring against opposite sides of the perforated lantern ring 80. Hence, the channel member forms an annular, hollow fluid vessel 76 a which is in direct connection with a port 86 through the perforations in the lantern ring 80. A fluid passage 88 in communication with the port 86 carries a piston member 90 which is threaded at 92 into the duct 88. The duct 88 is filled with a suitable liquid with a vent plug 94 removed to indicate when the filling is complete. Then, in normal valve operation with the filler plug 94 and the piston member 90 in place, the fluid within the passageway 88 is not pressured and the channel ring 76, being of a diameter greater than that of the stem, performs no sealing function. However, if it is desired to replace the stem packing 74, it is merely necessary to thread the plug 92 inward to force the piston further into the passageway 88 and drive the incompressible fluid under pressure into the chamber 76 a within the seal, forcing the web of the channel member into snug sealing engagement with the stem.

While this invention has been described in conjunction with preferred embodiments, it is obvious that further modifications and changes may be made thereto by those skilled in the art without departing from the spirit and scope of this invention.

What we claim is:

1. In a valve structure comprising:

a valve body housing having a bonnet with a generally cylindrical opening therein, a complementary, generally cylindrical valve stem extending through said opening, and main packing means sealing off said opening around said valve stem, An auxiliary valve stem seal comprising:

a recess in said bonnet around said valve stem inward of said main packing means, a seal ring in said recess normally free of engagement with said valve stem but deformable under pressure differential in a given direction thereacross into sealing engagement around said valve stem;

duct means connecting said recess to said valve body housing for introducing relatively high pressure fluid to said recess in said given direction to produce said pressure differential, and valve means selectively operated to block or free said duct means.

2. The combination defined by claim 1 wherein said recess has generally parallel annular sidewalls and a bottom wall concentric with said valve stem, and said seal ring comprises:

an elastomeric ring contained in said recess, said seal ring having an undeformed inner diameter larger than that of said valve stem, and said pressure fluid introducing means is selectively operated to bring the bottom of said recess into communication with a source of high pressure.

3. The combination defined by claim 1 including:

second duct means connecting said recess to atmosphere, said valve means being operable to open said second duct means.

4. The combination defined by claim 2 wherein:

said seal ring normally seals between and against said recess sidewalls to prevent passage of pressure fluid introduced to the bottom of said recess.

5. The combination defined by claim 4 wherein:

said seal ring is normally of a cross-sectional dimension axially thereof greater than the distance between said recess sidewalls.